(12) United States Patent
Lieu

(10) Patent No.: US 7,949,870 B2  
(45) Date of Patent: May 24, 2011

(54) METHOD AND APPARATUS FOR DOWNLOADING INFORMATION CONTENT TO A WIRELESS TERMINAL

(75) Inventor: Winston Hong Lieu, Holmdel, NJ (US)

(73) Assignee: Mochis Investments LLC, Dover, DE (US)

( * ) Notice: Subject to any disclaimer, the term of this patent is extended or adjusted under 35 U.S.C. 154(b) by 1236 days.

(21) Appl. No.: 11/297,101

(22) Filed: Dec. 8, 2005

(65) Prior Publication Data

US 2007/0136571 A1    Jun. 14, 2007

(51) Int. Cl.
- G06F 9/00 (2006.01)
- G06F 7/04 (2006.01)
- H04L 29/06 (2006.01)
- H04L 9/32 (2006.01)
- H04L 9/00 (2006.01)

(52) U.S. Cl. ............ 713/153; 713/1; 713/150; 713/155; 713/169; 726/10; 726/12; 726/27; 380/262; 380/270

(58) Field of Classification Search ................... 713/153, 713/1, 150, 155, 169; 455/414, 438, 460, 455/79, 564, 123; 726/10, 12, 27; 380/262, 380/270

See application file for complete search history.

(56) References Cited

U.S. PATENT DOCUMENTS

| | | | |
|---|---|---|---|
| 2002/0052674 A1* | 5/2002 | Chang et al. | 700/300 |
| 2003/0047830 A1* | 3/2003 | Ito et al. | 264/46.4 |
| 2004/0093595 A1* | 5/2004 | Bilange | 717/171 |
| 2004/0181591 A1* | 9/2004 | Yu et al. | 709/217 |
| 2006/0014529 A1* | 1/2006 | Tomiya et al. | 455/414.1 |
| 2006/0218613 A1* | 9/2006 | Bushnell | 725/109 |
| 2006/0277277 A1* | 12/2006 | Landschaft et al. | 709/220 |
| 2007/0078964 A1* | 4/2007 | East et al. | 709/224 |

FOREIGN PATENT DOCUMENTS

GB    2372587 A   *   8/2002

* cited by examiner

Primary Examiner — Nasser Moazzami  
Assistant Examiner — Mohammad W Reza  
(74) Attorney, Agent, or Firm — Fitch Even Tabin & Flannery

(57) ABSTRACT

A method and apparatus for downloading information content to a wireless terminal. The information content is obtained from a content provider that is accessible over a network, such as the World Wide Web. The information content, which is available on a subscription basis, is downloaded directly to the wireless terminal. Access to the network, access to the content provider, and downloading the information content is performed automatically according to a schedule, in accordance with the subscription.

12 Claims, 4 Drawing Sheets

Figure 4

| 204 | | | | | |
|---|---|---|---|---|---|
| 1. Network Access/Authentication Code | 2. Node Access/ Authentication Code | 3. Download Authentication Code | 4. Download Schedule | | |

METHOD AND APPARATUS FOR DOWNLOADING INFORMATION CONTENT TO A WIRELESS TERMINAL

FIELD OF THE INVENTION

The present invention relates to wireless terminals, and, more particularly, to receiving information content at wireless terminals.

BACKGROUND OF THE INVENTION

Developments in information processing, telecommunications and computing have enabled business persons to literally take their office with them while traveling. With the advent of DVD-R discs and multi-gigabyte hard drives for information storage, a virtually limitless amount of information becomes portable. With mobile phones and an ability to remotely retrieve e-mail, business persons can be contacted when they are traveling as readily as when they are in the office. With a WiFi- or WiMax-enabled lap top computer, the information content of the Internet becomes available.

Notwithstanding these developments, access to and retrieval of information can be problematic. For example, some mobile phones are capable of providing access to the Internet. But unless a user has a fairly high comfort level and degree of familiarity with portable computing and telecommunication devices, accessing and retrieving data in this fashion can be daunting and difficult. In particular, the access and authentication procedures required to (1) gain access a network; (2) gain access to a server on the network; and (3) download content from the server to a mobile phone are complicated. Rather than dealing with this challenge, many if not most mobile-phone users will simply not use this capability.

Another barrier to use of the Internet-access capability of mobile phones relates to the hesitancy of users to provide credit card information during the purchase and download of content.

As a consequence, there is a need for improvements in the way information can be accessed by a user via a wireless terminal, such as a mobile phone.

SUMMARY OF THE INVENTION

The present invention provides a way to receive information at a wireless terminal (e.g., mobile phone, personal digital assistant, etc), without some of the costs and disadvantages of the prior art.

In a method in accordance with illustrative embodiment of the invention, content is downloaded from a node on a network (e.g., a web site, etc.) to a wireless terminal. The content is available on a subscription basis, whereby the type of content (e.g., stock prices, sports scores, etc.) is pre-selected by a subscriber.

Access to the node is automatic. More particularly, at a pre-determined time of day or at a pre-determined time interval, the wireless terminal establishes a telecommunications session with the network through which the node is accessed. This takes place without user intervention. Automatic access is accomplished using appropriate access/authentication addresses and codes that are stored in the memory of the wireless terminal.

Automatic access spares the user from the cumbersome and complicated access and authentication procedures that are typically required to obtain information from a web site, for example. And since the user does not need to enter information, a simpler keypad (i.e., one without numeric or QWERTY keys) can be used.

Content is downloaded directly to the wireless terminal. In other words, the present method dispenses with the time consuming and somewhat complex task of first downloading information to a lap-top or desk-top computer and then transferring the information files to the target device (i.e., wireless terminal).

After the user pre-selects the content he or she wishes to receive and the various addresses and access/authentication codes are stored in the memory of the wireless terminal, daily or more frequent downloads occur in a fashion that is effectively invisible to the user.

In some embodiments, this capability to automatically access and directly download content is limited to a single network node, although the wireless terminal still possesses the capability of accessing any web site via normal procedures. In some other embodiments, access to the network (e.g., the Internet, etc.) via the wireless terminal is limited to the single node that is automatically accessed. To users that would not otherwise attempt to access content via a wireless terminal, this is actually not a "limitation" at all.

BRIEF DESCRIPTION OF THE DRAWINGS

FIG. 4 depicts some of the contents of the memory of the wireless terminal of FIG. 2.

DETAILED DESCRIPTION

Figure 1:
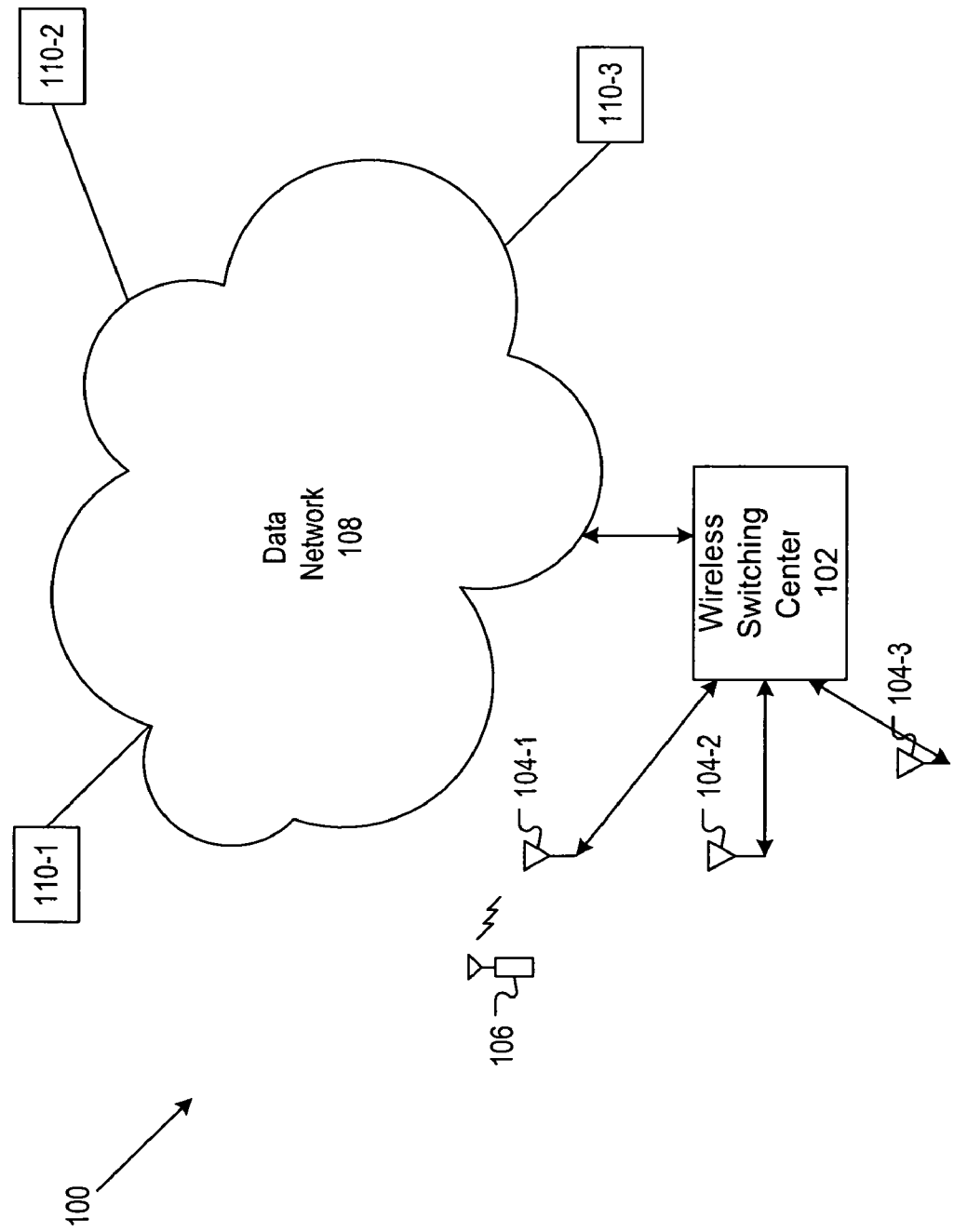
FIG. 1 depicts a schematic diagram of a system for accessing information content and downloading it to a wireless in accordance with the illustrative embodiment of the present invention.

FIG. 1 depicts a schematic diagram of system 100 by which information content is accessed and downloaded to wireless terminal 108. System 100 includes a wireless switching center 102, base stations 104, wireless terminal 106, and data network 108.

Wireless switching center 102 is connected to a plurality of base stations (e.g., base stations 104-1 through 104-3, etc.) that are dispersed throughout the geographic area serviced by the system. Wireless switching center 102 is also connected to data network 108 as well as to the local and long-distance telephone networks (not depicted). Wireless switching center 102 is responsible for, among other things, establishing and maintaining a telecommunications link with data network 108 as well as establishing and maintaining calls between wireless terminal 106 and other wireless or wireline terminals (not depicted), in known fashion.

Network 108 (e.g., the Internet, WAN, LAN, etc) includes a plurality of nodes (e.g., nodes 110-1 through 110-3, etc.). Each node represents a network element (e.g., a server, a switch, etc.). Some nodes, for example nodes 110-1 and 110-3, provide content that can be accessed for downloading.

Figure 2:
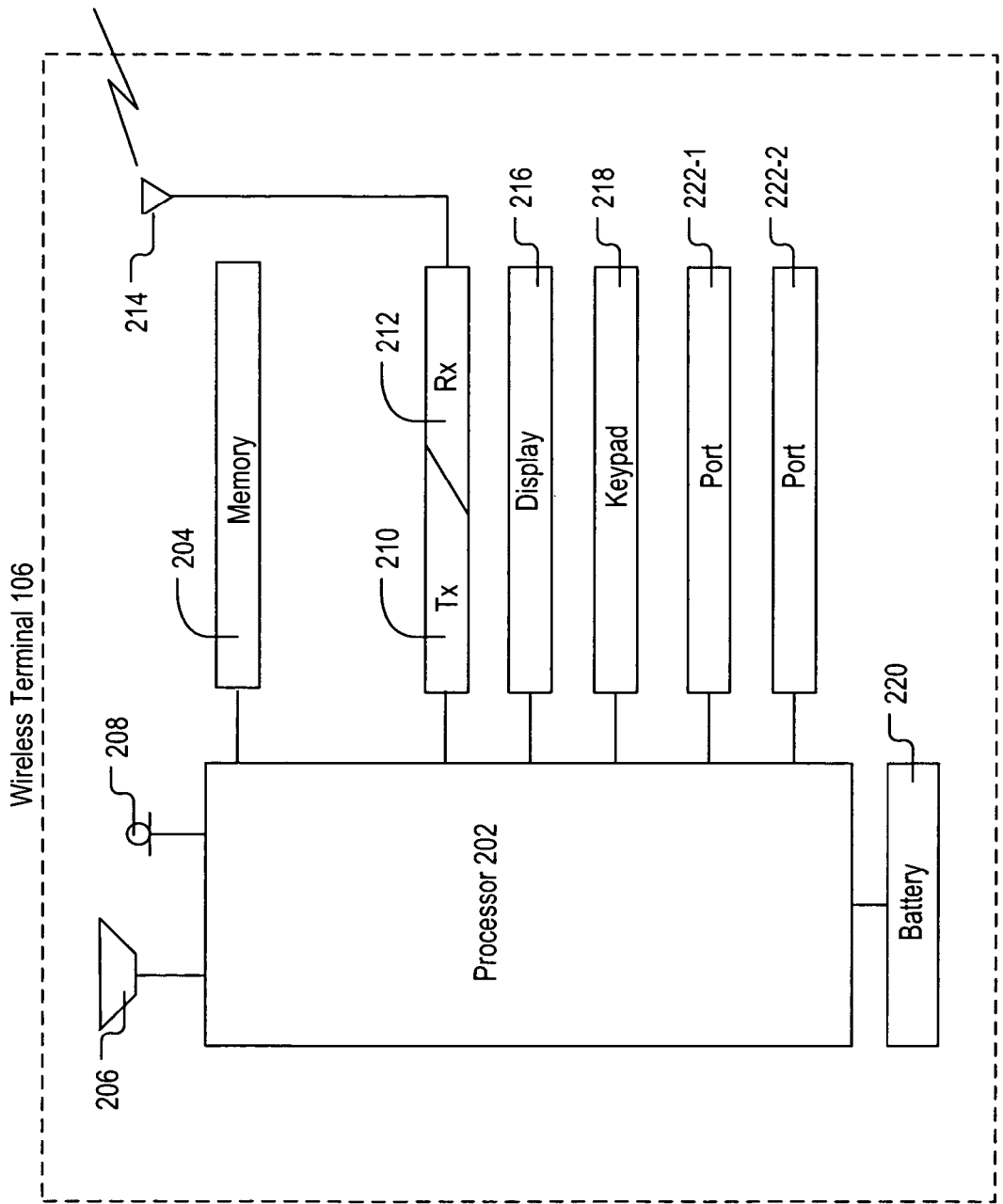
FIG. 2 depicts a wireless terminal for use in conjunction with the system of FIG. 1.

FIG. 2 depicts a block diagram of the salient components of wireless terminal 106.

Wireless terminal 106 includes any hand-held device that incorporates or can be made to incorporate wireless telecommunications capabilities. For example, in various embodiments, wireless terminal 106 is a mobile phone, personal digital assistant, a telephone, a game controller, a digital camera, etc.

In the illustrative embodiment that is depicted in FIG. 2, wireless terminal 106 comprises: processor 202, memory 204, speaker 206, microphone 208, transmitter 210, receiver 212, antenna 214, visual display 216, keypad 218, battery 220, and ports 222-1 and 222-2.

Speaker 206 is capable of outputting an acoustic signal (e.g., the speech of another person, an alerting or ringing signal, etc.) to a user of wireless terminal 106 in well-known fashion. Microphone 208 is capable of receiving an acoustic signal (e.g., the speech of the user of wireless terminal 106, etc.) and of conveying it to processor 202 for conversion to a digital signal.

Transmitter 210, receiver 212, and antenna 214 provide wireless telecommunications capability at radio frequencies for wireless terminal 106 in known fashion.

Display 216 is a visual display that enables wireless terminal 106 to output information (e.g., text, images, video, etc.) to a user. Typically, display 216 can be illuminated to enhance viewing as desired. Keypad 218 is a tactile input device that enables wireless terminal 106 to receive information from a user.

Battery 220 is an energy-storage device (e.g., an electrochemical energy-storage device, etc.) that provides energy to processor 202 and the other components of wireless terminal 106 in well-known fashion.

Ports 222-1 and 222-2 enable a user to connect wireless terminal 106 to external devices. For example, port 222-1 enables the wireless terminal to connect to a battery charger. Optional port 222-2 is used to couple wireless terminal 106 to a computer. As described in more detail later in this specification, port 222-2 is used, in some embodiments, to download various addresses and codes into memory 204 of wireless terminal 106.

Processor 202, which includes associated control circuitry, is capable of coordinating and controlling the other components of wireless terminal 106 to provide wireless telecommunications capability (e.g., to support a network session, etc.). Among other capabilities, processor 202 is capable of executing instructions stored in memory 204, of reading data from and writing data into memory 204, and of executing the tasks described below and with respect to FIG. 3. Processor 202 is a suitably programmed general-purpose processor or, alternatively, can comprise special-purpose hardware. In either case, it will be clear to those skilled in the art how to make and use processor 202.

Figure 3:
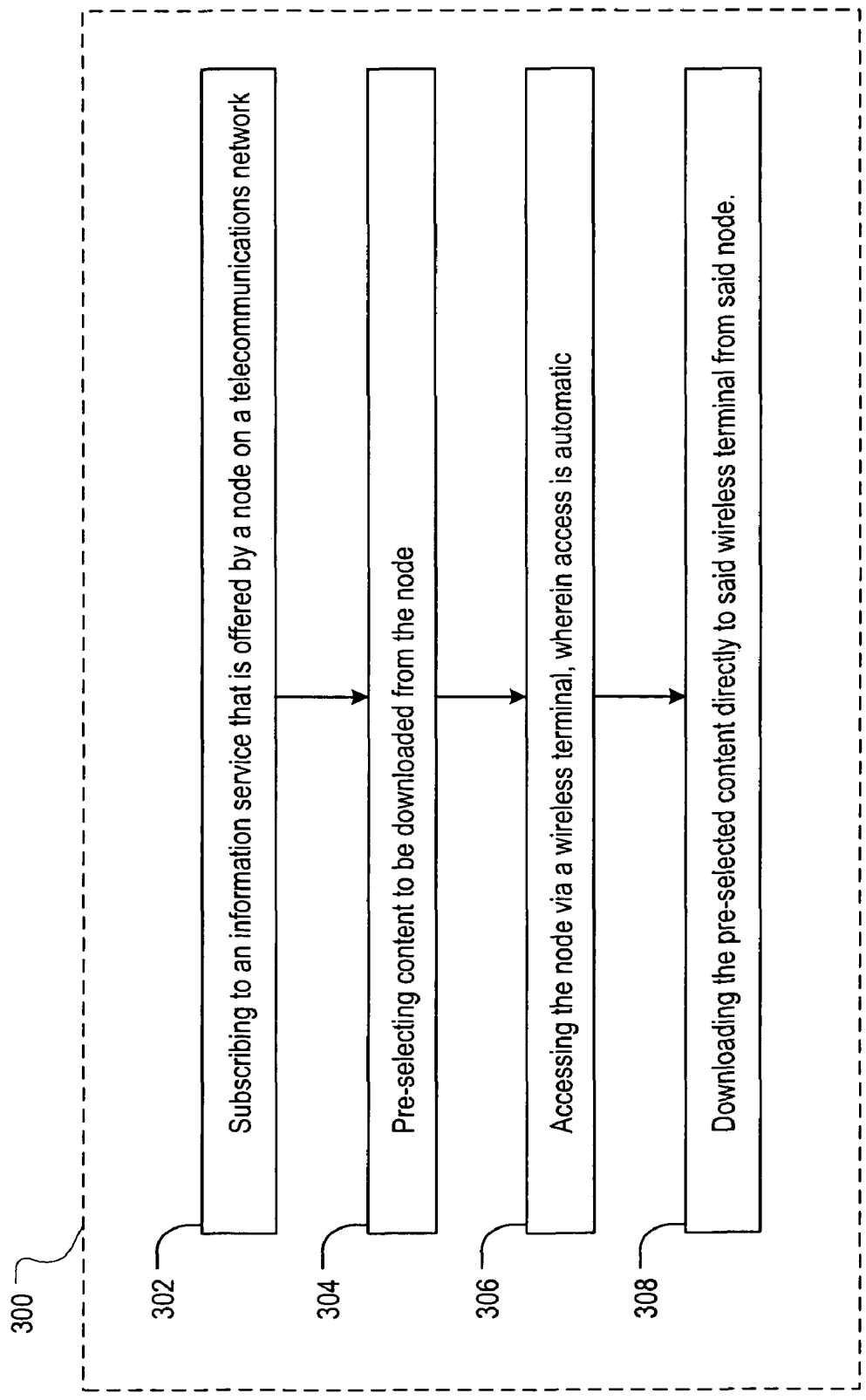
FIG. 3 depicts a method in accordance with the illustrative embodiment of the present invention.

As described in further detail later in this specification, memory 204 contains specific information and processor 202 is capable of performing certain functions that enable wireless terminal 106 to practice method 300, as depicted in FIG. 3 and described below.

FIG. 3 depicts method 300 in accordance with the illustrative embodiment of the present invention. In accordance with task 302 of method 300, a user subscribes to an information service that is offered by a node on a telecommunications network. Subscribing to the service typically requires that the user provide certain personal identifying information, such as the subscriber's name, phone number, e-mail address, credit card information, etc.

In accordance with task 304 of method 300, the user preselects the content to be downloaded to the user's wireless terminal. In some embodiments, the subscription is based on a subscription plan. The subscription plan defines the amount of content that a user will have access to, specifies the frequency of downloads and, in some embodiments, the number of location(s) at which a user can access (i.e., download) the information. In some embodiments, the cost of the subscription is based on the content accessed (type and amount) and the frequency of access.

Consider, as an example, a business that offers up-to-date information concerning weather forecasts, stock prices, general business news, politics, sports, world news, and the like via a web site.

A user wishing to subscribe (i.e., task 302) to the information service would visit the web site, typically via a browser running on a lap-tap or home computer. The prospective subscriber will provide the required information to activate the subscription. The user will then (or as a part of the subscription process) select content of interest, in accordance with task 304.

Any of a variety of pricing plans can be established for the subscription. For example, in an "ala-carte" plan, content is individually priced and a user selects the content that he or she wishes to receive. See Table 1, below:

TABLE 1

Ala-Carte Pricing Structure

| Local Weather | Stock Quotes | Business News | Politics | | Sports Scores | | | Lottery |
| --- | --- | --- | --- | --- | --- | --- | --- | --- |
| | | | U.S. | World | U.S. Prof. | Coll. | Europe | |
| P1 | P2 (3x) | P3 | P4.1 | P4.2 | Football P5.1 | P5.2 | | P10 |
| | | | | | Soccer P6.1 | P6.2 | P6.3 | |
| | | | | | Basketball P7.1 | P7.2 | | |
| | | | | | Baseball P8.1 | P8.2 | | |
| | | | | | Hockey P9.1 | P9.2 | | |

As indicated in Table 1, in the "Ala-Carte" plan, the local weather is available at a cost of P1, based on a once-daily download. Stock quotes are available at a cost of P2 for each quote, for a thrice-daily download. Business news is available at a cost of P3, for a once-daily download. U.S. political news is available at a cost of P4.1 and foreign political news is available at a cost of P4.2. A variety of sports scores, at both the professional level, for US and Europe, as well as at the collegiate level, are available at the indicated pricing. And lottery results, at a cost of P.10 per result, are available.

As an example, the total subscription cost, C, under the ala-carte plan for a user wishing to receive 5 stock quotes, business news, and college football scores, is:

$$C = 5(P2) + P3 + P5.2.$$

Another type of subscription plan enables a subscriber to select content from a certain number of categories. For example, for a first pricing structure, a subscriber is entitled to select content from two categories, such as "Business News" and "Professional Football Scores." A second pricing structure permits a subscriber to select content from three categories, and so forth. In some embodiments, the pricing structure can reflect the number of times daily that the selected content is downloaded. For example, there might be a first pricing structure for a once-daily download, a second pricing structure for a twice-daily download, etc.

It will be appreciated that a wide variety of pricing structures can be developed. Furthermore, it will be understood that the information categories that are listed in Table 1 above are provided by way of illustration, not limitation. Any of a virtually unlimited number of different types of content can be offered for download on a subscription basis, as described above.

In accordance with task 306 of method 300, the subscriber accesses the node (e.g., web site, etc.) of the content provider via wireless terminal 106, wherein access is automatic. In the context of this application, the term "automatic(ally)" means that wireless terminal 106 establishes a telecommunications session with the node without real-time user intervention.

Of course, before wireless terminal 106 can automatically download content from a content provider, a set-up protocol must be completed. In accordance with the illustrative embodiment, the set-up protocol provides wireless terminal 106 with the addresses and authentication codes, etc., that are required to (i) gain access to network 108 and (ii) gain access to a node, such as node 110-1. To the extent gaining access to node 110-1 does not, in and of itself, signify permission to download content, the set-up protocol provides wireless terminal 106 with an additional code to begin downloading content from node 110-1. This information resides in memory 204, as depicted in FIG. 4.

In some embodiments, the addresses and codes are downloaded to wireless terminal 106 during the initial contact (e.g., via computer, etc.) with node 110-1 (e.g., during task 302). In such embodiments, wireless terminal 106 is connected to the computer via port 222-2, which can be, for example, a USB port or other suitable type of port for interfacing with a computer. The addresses and authentication codes required for network and node access, etc., can then be downloaded to memory 204 within wireless terminal 106.

In some other embodiments, a call is placed by the new subscriber to a phone number that is associated with the content provider. The requisite addresses and authentication codes are then provided to the subscriber during the call.

The protocol also dictates when during the day or night wireless terminal 106 establishes a session with node 110-1 to receive the pre-selected content. The timing of the session can be based on a time of day, an elapsed time, etc. Wireless terminal 106 obtains timing information from an internal clock or, more typically, from routine control messages that it receives from the wireless network. The timing protocol is also maintained in memory 204.

Processor 202 initiates the telecommunications session with node 110-1 based on the timing criteria and using the addresses and authentication codes stored in memory 204.

More particularly, wireless terminal 106 transmits the addresses and codes, which is received by a base station (e.g., base station 104-1, 104-2, or 104-3, etc.). The receiving base station relays the information to wireless switching center 102. Upon receipt of the information, and with the knowledge that it is intended for node 110-1, wireless switching center 102 launches the information (e.g., via modem, etc.) into network 108 for node 110-1.

At task 308, the pre-selected content is downloaded directly to wireless terminal 106 from node 110-1. In the context of this specification, the term "directly" means that the content is downloaded from node 110-1 to wireless terminal 106 without the intermediate task of receiving the content at a computer (e.g., desk-top or lap-top computer, etc.) and then transferring it from the computer to the wireless terminal. An example of this undesired intermediate task is the common exercise of downloading music from a content provider (e.g., I-Tunes® website, etc.) to a personal computer, and then transferring the music file from the computer to a portable player (e.g., IPOD®, etc.). This type of intermediate download is avoided with the illustrative method.

In further detail, when node 110-1 receives the appropriate codes, it releases the pre-selected content for download to wireless terminal 106. The content is received (e.g., via modem, etc.) at wireless switching center 102, which routes it to the appropriate base station 104. The base station relays the information, via radio, to wireless terminal 106.

In the illustrative embodiment, wireless terminal 106 initiates the telecommunications session with a node (e.g., node 110-1) as described above. In some alternative embodiments, the node initiates the telecommunications session with wireless terminal 106.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   accessing a node on a telecommunications network using a first terminal at a first time interval;
   subscribing to an information service of the node;
   selecting content of the information service using the first terminal from a plurality of categories, the selected content to be downloaded to a second terminal, which is a wireless terminal;
   downloading set-up protocol for accessing the node to the second terminal from the first terminal wherein the setup protocol provides the second terminal with an address and authentication code associated with the node;

accessing the node via the second terminal using the setup protocol wherein accessing is automatic and without user intervention; and downloading the selected content corresponding to at least two of the plurality of categories to the second terminal from the node at time intervals different from the first time interval.

2. The method of claim 1 wherein accessing the node via the second terminal is limited to accessing the node and no other node.

3. The method of claim 1 wherein accessing the node via the second terminal comprises:

obtaining wireless internet access without user intervention; and obtaining authorization to enter the node without user intervention.

4. The method of claim 1 wherein accessing the node via the second terminal comprises accessing the node at a specific time interval.

5. The method of claim 1 wherein accessing the node via the second terminal comprises accessing the node daily at a specified time.

6. The method of claim 1 wherein accessing the node via the second terminal comprises accessing the node once per day.

7. The method of claim 1 wherein downloading the set-up protocol comprises connecting an interface between the first terminal and the second terminal and using the interface to transfer the set-up protocol from the first terminal to the second terminal.

8. A method of operating a base station of a wireless network, the method comprising:

receiving set-up protocol from a wireless terminal, wherein:

the set-up protocol comprises an address associated with a node connected to the wireless network and an authentication code for accessing the node;

the set-up protocol is transmitted from the node to another terminal;

the node is configured to provide a subscription-based information service with content selected from a plurality of categories using the other terminal at a first time interval for download to the wireless terminal; and the set-up protocol is transmitted from the wireless terminal automatically and without user intervention;

transmitting the set-up protocol from the wireless terminal to a wireless switching center;

receiving the selected content corresponding to at least two of the plurality of categories from the node via the wireless switching center; and transmitting the selected content to the wireless terminal at time intervals different from the first time interval.

9. The method of claim 8 further comprising receiving a call from the wireless terminal to a phone number that is associated with the node.

10. The method of claim 8 further comprising transmitting an additional code to the node via the wireless switching center before the base station receives the selected content from the node via the wireless switching center.

11. A method comprising:

providing a subscription-based information service at a node of a network;

permitting access to the node at a first time interval;

receiving a subscription to the information service from a first terminal;

receiving a selection of content from a plurality of categories from the first terminal;

transmitting set-up protocol to the first terminal, the set-up protocol comprising an address and a code for accessing the node, the set-up protocol being configured to be transmitted to a second terminal, which is a wireless terminal;

receiving the access code of the set-up protocol from the second terminal;

permitting access to the node from the second terminal, wherein access is automatic and without user intervention; and transmitting the selected content corresponding to at least two of the plurality of categories to the second terminal from the node at time intervals different from the first time interval.

12. The method of claim 11 wherein the set-up protocol comprises an additional code, and the method further comprises receiving the additional code from the second terminal before transmitting the selected content to the second terminal.

* * * * *

UNITED STATES PATENT AND TRADEMARK OFFICE
CERTIFICATE OF CORRECTION

PATENT NO. : 7,949,870 B2
APPLICATION NO. : 11/297101
DATED : May 24, 2011
INVENTOR(S) : Lieu Page 1 of 1

It is certified that error appears in the above-identified patent and that said Letters Patent is hereby corrected as shown below:

Column 7, line 4, in Claim 1, delete "setup" and insert -- set-up --.

Signed and Sealed this
Fourth Day of October, 2011

David J. Kappos
*Director of the United States Patent and Trademark Office*